2,805,119

ALKALI CELLULOSE XANTHATES

Martin Studer, Emmenbrucke, near Lucerne, Switzerland, assignor to Societe de la Viscose Suisse, Emmenbrucke, near Lucerne, Switzerland, a corporation of Switzerland No Drawing. Application January 12, 1954, Serial No. 403,667

3 Claims. (Cl. 18—54)

This invention relates to the preparation of pure, substantially stable, alkali cellulose xanthates and more particularly to the isolation of these compounds from technical alkali cellulose xanthate solutions which are formed as intermediate products in the production of rayon by the viscose process.

As is well known, in the viscose process for the production of rayon, alkali cellulose is converted into soluble alkali cellulose xanthate by treatment with carbon disulphide. The solution of the alkali cellulose xanthate in dilute sodium hydoxide solution, i. e., viscose, is pressed through nozzles into an acid bath, which may contain salts, and the xanthate is thus decomposed, the cellulose being regenerated in filament form.

At the time of the discovery of the viscose process, it was proposed also to employ alkali cellulose xanthate for purposes other than the spinning of textile fibres, for example as a dressing or finishing agent and as an adhesive or binding agent. However, technical alkali cellulose xanthate is not stable, but spontaneously decomposes, at a rate dependent on temperature, to an appreciable extent within hours and completely within a few days. It is thus re-converted into insoluble cellulose, the xanthate groups being split off. The effect therefore is that alkali cellulose xanthate though initially water soluble, loses that water-solubility on standing. However, for use as a dressing or finishing agent or as a binding or adhesive agent the cellulose xanthate should have a good solubility in water, which solubility must be maintained over a period of several months.

The solubility of cellulose xanthate depends in the first place upon the chain length of the cellulose molecules or the average degree of polymerisation (hereinafter referred to as the DP value), in the sense that the solubility increases as the DP value decreases. It is possible, therefore, to improve the solubility by depolymerisation, of the cellulose units but this is highly undesirable since it affects adversely the mechanical properties of the product, so that, for example, coatings consisting of such a cellulose would not have the necessary strength.

The water solubility also increases with the degree of xanthogenation, i. e. the ratio of mol. $CS_2$ to mol. glucose residues in the xanthate.

This ratio is hereinafter referred to as the $x$ value. The decomposition of the xanthate occurs as a result of a hydrolysis or saponification for which water is necessary, and it is known that hydrogen ions catalyse the decomposition. Accordingly it has been proposed to isolate the xanthate and dry it. The processes hitherto suggested for this purpose can be broadly divided into two groups. On the one hand, it has been proposed to extract the alkali cellulose xanthate which remains after the xanthogenation step (and which has not yet been converted into viscose) by means of liquids such as concentrated salt solutions or organic solvents, and thereafter to dry the xanthate, which is as free as possible from by-products. In the other group of processes, the cellulose xanthate is precipitated from the viscose by heating or by means of precipitation liquids in which the by-products are soluble, and the precipitate is thereafter washed and dried in the coagulated state.

All the aforesaid processes, however, have the disadvantage that the xanthates are in the form of small lumps or of pulverous precipitates which persistently retain impurities, by-products, and water. Adequate purification and drying can therefore only be effected by protracted or repeated operations, and this is itself disadvantageous since prolonged or repeated treatments tend to split off the xanthate groups, resulting in a retraction in solubility. It is particularly of importance that the drying process be carried out at the lowest possible temperature and in the shortest possible time in order to avoid a rapid decrease in the $x$ and DP values. Further, there is a tendency, in the drying process, to the formation of a skin on the xanthate lumps or particles so that the last residues of water cannot be removed without simultaneously decomposing the xanthate. For these reasons it has not been possible to adopt these processes successfully in industry.

The effectiveness of these prior proposals as a method of producing a stable cellulose xanthate soluble in water is a matter of some doubt since it is observed that generally it is only suggested that the products are soluble in caustic alkali solution but this would also be true of products which had lost a large part of the xanthate groups and even of cellulose itself.

The possible uses of a solution of alkali cellulose xanthate in aqueous sodium hydroxide are somewhat limited. Thus, for example, cellulose fibres swell considerably therein, and such solutions cannot be employed on cellulose acetate textiles since the textiles would be partially saponified thereby. In one process which has been proposed, crude undissolved alkali cellulose xanthate is spread out in a thin layer, if desired after extraction with acetone, and dried with hot air; the xanthate obtained is stated to be soluble in dilute sodium hydroxide solution and to be stable for several months. However, it contains a large proportion of alkali and would therefore not be suitable for the treatment of cellulose acetate fibres. It is an object of the present invention to produce an alkali cellulose xanthate which is free from any excess of alkali, which has a DP value not lower than 250 and a degree of xanthogenation ($x$ value) of at least 0.45 when an appropriate viscose is employed, and which remains completely water-soluble for at least one year when suitably stored.

According to the present invention a process for the production of a substantially pure stable alkali cellulose xanthate comprises extruding viscose through spinnerets into a liquid precipitant for alkali cellulose xanthate, treating the alkali cellulose xanthate filaments thus obtained with a water-miscible organic solvent and drying the filaments first for a short period in a current of warm air and then at reduced pressure in the presence of a dehydrating agent.

In the preferred form of the invention, by means of which products of excellent stability and water-solubility are obtained, the water miscible organic solvent used is diethyl ether, the air drying is effected at a temperature of 30–60° C. and has a duration of at least 30 minutes, and the final drying step is effected at low pressure over phosphorus pentoxide.

The precipitation bath is preferably maintained at a temperature below 5° C. and may consist, for example, of methanol, if desired containing salts, or saturated aqueous salt solutions. A particularly advantageous bath consists of an aqueous solution of ammonium sulphate. The filamentary material is preferably cut into short staple sections between two of the aforesaid steps of the process. The following example will serve to illustrate the invention but is not to be regarded as limiting it in any way:

Example

An alkali cellulose produced from sulphite pulp and containing 30% of α-cellulose and 15% of NaOH was xanthogenated using 65 kg. of carbon disulphide per 100 kg. of α-cellulose. The alkali cellulose xanthate obtained was dissolved in dilute caustic soda solution to yield a viscose containing 7% of α-cellulose having a DP value of 450 and 7% of NaOH, with an $x$ value of 0.9. The viscose was extruded through spinnerets into a bath of absolute methanol at —5° C., to yield fibres of sodium cellulose xanthate. The fibres were washed in diethyl ether, freed from ether in a dry warm air current at 60° C. for 30 minutes, and dried for 72 hours at 20° C. in a vacuo over phosphorus pentoxide. The product obtained had an $x$ value of 0.5. A specimen of this sodium cellulose xanthate stored away from the air had an $x$ value of 0.45 after twelve months and could be clearly and completely dissolved in water.

By means of the process of the present invention, the alkali cellulose xanthate, since it is present in fibre form, can be very readily and effectively dried. No grinding process is necessary but at most a cutting process, and the process of production can be carried out as a continuous process.

The product may be employed as an adhesive or binding medium or as a treating medium for textiles, i. e. for dressing or finishing. By applying it to a textile support from an aqueous or alkaline solution, and thereafter decomposing it into cellulose, durable coatings are obtained which impart to the textile surface properties similar to those of cellulose textiles, which coatings are not removed by ordinary washing.

I claim:
1. A process for the production of a substantially pure stable alkali cellulose xanthate having a molecular ratio of at least 0.45 mols of CSS per mol of glucose, which comprises extruding viscose through a spinneret into a methanol medium which is at a temperature below 5° C., treating the alkali cellulose xanthate filaments thus obtained with diethyl ether and drying the filaments first for at least 30 minutes at 30–60° C. and then at low pressure in the presence of a dehydrating agent.
2. A process according to claim 1 wherein the dehydrating agent is phosphorus pentoxide.
3. A process according to claim 1 wherein the filaments are cut to staple fibre prior to the first stage of drying thereof.

References Cited in the file of this patent
UNITED STATES PATENTS

| | | |
|---|---|---|
| 1,119,155 | Hartogs | Dec. 1, 1914 |
| 1,467,265 | Conley | Sept. 4, 1923 |
| 1,880,041 | Richter et al. | Sept. 27, 1932 |
| 2,054,300 | Richter | Sept. 15, 1936 |
| 2,072,738 | Dykstra | Mar. 2, 1937 |
| 2,181,920 | Scherer | Dec. 5, 1939 |
| 2,296,857 | Lilienfeld | Sept. 29, 1942 |
| 2,592,355 | Tachihawa | Apr. 8, 1952 |
| 2,647,114 | Torhe et al. | July 28, 1953 |

OTHER REFERENCES

Ott: Cellulose and Cellulose Derivatives (1946), page 822. (Copy in Scientific Library.)